LOW FREQUENCY OSCILLATOR UTILIZING SATURABLE MAGNETIC TIMING CORE

Filed Dec. 21, 1961

INVENTOR.
JOHN C. FREEBORN
BY
Osmund R. Dahle
ATTORNEY

United States Patent Office 3,104,333

Patented Sept. 17, 1963

3,104,333

LOW FREQUENCY OSCILLATOR UTILIZING SATURABLE MAGNETIC TIMING CORE

John C. Freeborn, Woodland, Calif., assignor to Minneapolis-Honeywell Regulator Company, Minneapolis, Minn., a corporation of Delaware Filed Dec. 21, 1961, Ser. No. 161,232
6 Claims. (Cl. 307—88.5)

Figure 1:
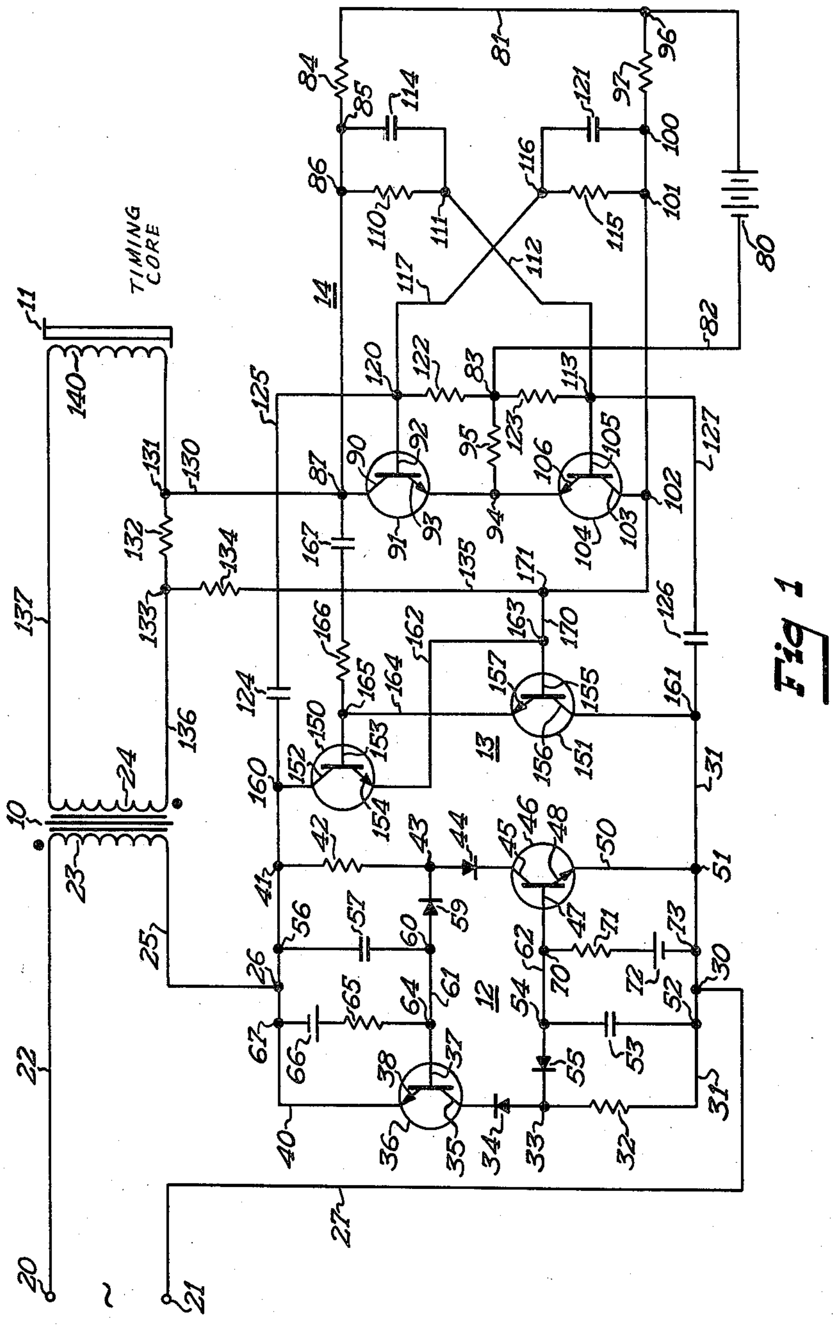

This invention relates to a precision low frequency or long interval oscillator and more specifically to a novel semiconductor-magnetic core low frequency oscillator.

It is an object of this invention to provide an improved low frequency semiconductor-magnetic core oscillator.

It is another object of this invention to provide a low frequency semiconductor-magnetic core oscillator utilizing a slightly unbalanced A.C. source to cause saturation of the magnetic core and a saturation feedback circuit for sensing core saturation and thereupon quickly drive the magnetic core into full saturation by blocking the half cycle of unbalanced alternating current that would normally tend to drive the core back out of saturation. Saturation of the magnetic core causes a switching signal to a bistable circuit which reverses the polarity of the A.C. unbalance each time core saturation is reached.

These and other objects of the invention will become more apparent upon a further consideration of the specification, claims and drawing of which:

The single FIGURE of the drawing is a schematic representation of a preferred embodiment of the invention.

Referring now to the figure, the oscillator system comprises in a broad sense the following major components including a driving transformer 10, a magnetic timing core 11, a saturation feedback circuit 12, a saturation feedback unlocking circuit 13 and a bistable switching circuit 14. Referring to the circuit components in detail, a pair of power input terminals 20 and 21 are connected to a suitable source of regulated alternating current potential. The terminal 20 is connected by a conductor 22 to a primary winding 23 of the driving transformer 10, which transformer also includes a secondary winding 24. The opposite end of winding 23 is connected by a conductor 25 to one terminal 26 of a saturation feedback circuit 12. Power input terminal 21 is connected by a conductor 27 to the opposite terminal 30 of a saturation feedback circuit 12.

A direct current path may be traced from the terminal 30 to a conductor 31, a resistor 32, a junction 33, a diode 34 to a collector 35 of a semiconductor current controlling device, here shown as an npn transistor 36. The transistor 36 also includes a base electrode 37 and an emitter electrode 38, which emitter electrode 38 is connected by a conductor 40 to the terminal 26. Another current path may be traced from the terminal 26 through the conductor 40 to a junction 41, a resistor 42, a junction 43, a diode 44 to a collector electrode 45 of another semiconductor current controlling device 46, similar to the device 36. The transistor 46 also includes a base electrode 47 and an emitter electrode 48, which emitter electrode is connected by a conductor 50 to a junction 51 on the conductor 31. The diode 34 and transistor 36 are poled to allow current flow from terminal 30 to terminal 26, and the diode 44 and transistor 46 are poled to allow current flow in the opposite direction from terminal 26 to terminal 30.

Connected in parallel with the resistor 32 is a circuit which commences at a junction 52 on conductor 31 and can be traced through a capacitor 53, a junction 54, and a rectifying diode 55 to the junction 33. Similarly, connected in parallel with the resistor 42 a circuit may be traced from a junction 56 on the conductor 40 through a capacitor 57, a junction 60 and a rectifying diode 59 to the junction 43. A conductor 61 connects the base electrode 37 of transistor 36 to the junction 60, and a conductor 62 connects the junction 54 to the base electrode 47 of transistor 46. A bias circuit for the transistor 36 comprises a junction 64 on the conductor 61, a resistor 65 and a bias battery 66 to a junction 67 on the conductor 40. The battery is polarized in a direction to normally render transistor 36 conductive. A bias circuit for normally rendering transistor 46 conductive may also be traced from a junction 70 on the conductor 62 through a resistor 71 and a bias battery 72 to a junction 73 on the conductor 31.

Referring now to the bistable circuit 14, a suitable source of direct current potential, such as a battery 80, has its positive terminal connected to a conductor 81 and its negative terminal to a conductor 82 which terminates at a junction 83. The conductor 81 is connected through a resistor 84 and a series of junctions 85, 86 and 87 to a collector electrode 90 of an npn type junction transistor 91. The transistor 91 also includes a base electrode 92 and an emitter electrode 93, the emitter electrode 93 being connected by means of a junction 94 and a biasing resistor 95 to the junction 83.

The opposite current path in the bistable circuit 14 may be traced from a junction 96 on the conductor 81 through a resistor 97 and a series of junctions 100, 101 and 102 to a collector electrode 103 of a transistor 104 which is of the same type as transistor 91. The transistor 104 also includes a base electrode 105 and an emitter electrode 106, the emitter electrode 106 being directly connected to the junction 94 and the emitter 93.

A regenerative feedback circuit may be traced from the collector 90 of transistor 91 to the base electrode 105 of transistor 104 from the junction 86 through a resistor 110, a junction 111, a conductor 112, and a junction 113 which is connected to base 105. A capacitor 114 is connected between the junctions 85 and 111 paralleling the resistor 110. In similar fashion, a regenerative feedback circuit is connected between the collector electrode 103 and the base electrode 92, which circuit may be traced from junction 101 through a resistor 115, a junction 116, a conductor 117 and a junction 120 to the base electrode 92. A capacitor 121 is connected from junction 100 to junction 116 paralleling resistor 115.

A bias circuit from the base 92 of transistor 91 may be traced from the junction 120 through a resistor 122 to the junction 83. A similar bias circuit may be traced from the base 105 through the junction 113 and a resistor 123 to the junction 83.

A signal input circuit for the bistable circuit may be traced from the conductor 40 through a coupling capacitor 124 and a conductor 125 to the junction 120, and another input circuit may be traced from the conductor 31 through a coupling capacitor 126 and the conductor 127 to the junction 113.

An output circuit exists from the bistable circuit 14 which may be traced from the collector electrode 90 and junction 87 through a conductor 130, a junction 131, a relatively low resistance 132, a junction 133, a relatively high resistance 134, and a conductor 135 to the junction 102 and collector electrode 103. In connection with the resistor 132, a circuit may be traced from junction 133 through a conductor 136, the secondary winding 24 of driving transformer 10, a conductor 137 and a winding 140 on the saturable timing toroid 11 to the junction 131. The magnetic timing core 11 is designed to have a substantially rectangular hysteresis loop.

The saturation feedback unlocking circuit 13 comprises a pair of transistors 150 and 151, with transistor 150 having a collector eelctrode 152, a base electrode 153, and an emitter electrode 154, the transistor 151 including a base electrode 155, a collector electrode 156, and an emitter electrode 157. The collector electrode 152 is directly connected to a junction 160 on the conductor 40, and the collector electrode 156 is directly connected to a junction 161 on the conductor 31. Emitter electrode 154 is connected by a conductor 162 and a junction 163 to the base electrode 155, and emitter 157 is connected by a conductor 164 and a junction 156 to the base electrode 153. The junction 165 is connected by a resistor 166 and a capacitor 167 to the junction 87 in the bistable circuit 14. The junction 163 is connected by a conductor 170 to a junction 171 on the conductor 135.

In considering the operation of my invention, the operation will first be discussed in relatively general terms followed by a more specific description.

In my invention a low frequency oscillator is provided by energizing a saturable magnetic core with both an A.C. potential and a D.C. potential. The two potentials may be considered as being superimposed. The magnitude of the alternating current potential applied to the core should be large enough to cause a change in the flux of the core along a minor hysteresis loop but should be relatively small compared to the potential required to cause the core flux to follow the excursion of the major hysteresis loop. The direct current potential applied to the core is of relatively small magnitude compared to the A.C. applied thereto. Neither the A.C. potential nor the D.C. potential is capable, by itself, of saturating the timing core.

The energization of the core by A.C. and D.C. has the effect of increasing the magnitude of one half cycle of the A.C. and decreasing the succeeding half cycle or, in other words, unbalancing or offsetting the A.C. which results in the core flux slowly moving towards saturation in a series of minor hysteresis loops. The driving transformer 10 serves to isolate unbalancing influences caused by component variation and other direct current deviations in the alternating current source. The saturation of timing toroid 11 serves to time the period of oscillation for the low frequency magnetic oscillator. The bistable flip-flop circuit 14 is effective to reverse the polarity of the direct current unbalance voltage applied to the timing toroid 11 upon saturation being reached. The function of saturation feedback circuit 12 is to sense the beginning of saturation of timing toroid 11 and to block the half cycle of unbalanced alternating current that would normally drive the toroid back out of saturation thereby quickly driving the system into saturation. The saturation feedback unlocking circuit 13 functions to nullify the action of the saturation feedback circuit by permitting the system to come out of saturation after the half cycle has been completed.

Referring now to the operation of the circuit in more detail, the saturation feedback circuit transistors 36 and 46 are normally biased to conduction by the bias supplies 66 and 72, respectively. During the half cycle when terminal 21 is positive, the alternating current flows through conductors 27 and 31, resistor 32, diode 34, transistor 36, conductors 40 and 25, winding 23 and conductor 22; on the succeeding half cycle when terminal 21 is negative, the current flows through conductor 22, primary winding 23, resistor 42, diode 44, and transistor 46 and conductors 50, 31 and 27. Transistor 36, diode 34, and resistor 32 act as a unidirectional current path or asymmetric current flow circuit from junction 30 to junction 26; and transistor 46, diode 44 and resistor 42 act as a second unidirectional current path or asymmetric current flow circuit from junction 26 to junction 30. This circuit then represents a relatively low impedance to the applied A.C. which is effectively applied through the driving transformer 10 to the timing toroid 11.

The voltage drop across resistor 132 is provided for the timing core 11 by means of the voltage divider resistors 132 and 134 connected across the collector electrodes 90 and 103 of the bistable circuit 14. This voltage drop across resistor 132 serves to unbalance the alternating current drive fed to the timing toroid 11 through the driving transformer 10. The D.C. level introduced by this resistor is in the millivolt range and would not in itself be sufficient to saturate the timing core. The A.C. potential supplied by the driving transformer is sufficient to cycle the core in a minor hysteresis loop and appears to the core 11 to be unbalanced due to the superimposed, millivolt level D.C. potential. Since neither the D.C. unbalance nor the A.C. drive is capable of saturating the timing core, numerous minor traversions of the hysteresis loop are required, and since the A.C. fed to the timing core is unbalanced by the drop across resistor 132, each traverse of the B—H curve moves the step closer to the saturation point.

When the timing core 11 reaches saturation level its impedance decreases and the current in one half cycle of A.C. is increased. This increase is reflected to the primary winding 23 of the driving transformer 10 and the saturation feedback circuit conducts more heavily on that half cycle. Let it be assumed that during the half cycle when terminal 21 is positive and current is flowing through resistor 32, diode 34 and transistor 36, saturation level is reached and the current of this half cycle is increased. This increase of current results in enough voltage drop across the resistor 32 to overcome the threshold of normally nonconductive diode 55 and charge capacitor 53. This charge on capacitor 53 is negative at junction 54 with respect to junction 52 and produces a back bias on transistor 46 during a portion of the succeeding half cycle. The fact that transistor 46 is made nonconductive for a portion of the said succeeding half cycle unbalances the A.C. across the driving transformer 10 in such a way as to drive it hard into saturation by blocking the half cycle that would normally drive back out of saturation. This saturation feedback action is regenerative and once started it tends to lock into a condition of saturation of the series connected driving transformer 10.

The output of the saturation feedback circuit is the voltage across junctions 26 and 30. The low A.C. level across this circuit prior to saturation is not enough to trip the bistable circuit 14, but when saturation occurs a relatively large A.C. signal appears across the circuit which is sufficient to trip the bistable circuit 14. This relatively large A.C. voltage is coupled through capacitors 124 and 126 to the base electrodes 92 and 105 of transistors 91 and 104, respectively. The A.C. developed across this saturation feedback circuit 12 is again nearly symmetrical because the forward bias on the conducting transistor 36, as described above, is of low magnitude and when the driving transformer 10 is saturated the series impedance is so low that the transistor 36 cannot conduct a relatively high current dictated by the applied voltage and the series impedance. It is this half cycle of voltage which appears across the conducting transistor 36 which is used to trigger the bistable circuit 14 to its opposite mode.

When the bistable circuit 14 switches, it acts on transistors 150 and 151 of the saturation feedback unlocking circuit 13 to temporarily bypass the blocking action described above and permits the driving transformer 10 to return to its nonsaturated condition.

In other words, the saturation feedback unlocking transistors 150 and 151 performs a shunting action across the "off" transistor 46 at the time of bistable switching. The action of the unlocking circuit will now be discussed. As previously stated, as soon as transistor 46 is biased to non-conduction, the bistable circuit 14 is caused to trigger to its opposite state so that transistor 104 becomes conductive and the bistable circuit output at junctions 87 and 102 reverses polarity such that junction 102 becomes negative with respect to junction 87. As a result a current briefly flows from junction 87 through the RC circuit comprising resistor 166 and capacitor 167 and transistor 150 from base electrode 153 to emitter electrode 154 to junction 102. This provides a current path through transistor 150 from collector 152 to emitter electrode 154 and through the base-collector junction of transistor 151, thus effectively shunting the "off" transistor 46 and momentarily nullifies the action of the saturation feedback circuit permitting the driving transformer 10 to come out of saturation and again act as a source for the timing core. Transistor 46 again becomes conductive.

As was mentioned, the D.C. unbalance voltage across the bistable circuit has been reversed such that junction 87 is positive with respect to junction 102, thereby reversing the polarity of D.C. across resistor 132 such that junction 131 is positive with respect to junction 133. Since the direction of the D.C. across resistor 132 is reversed, the timing core 11 is gradually driven towards saturation in the opposite direction in a series of minor hysteresis loops.

Upon saturation being reached in the opposite direction, which will occur during the half cycle when terminal 21 is negative, the current through resistor 42, diode 44 and transistor 46 will increase. The increased voltage drop across resistor 42 then exceeds the threshold of diode 59 and it will conduct to charge capacitor 57. This charge on capacitor 57 will be effective to render transistor 36 nonconductive in the same manner previously described for transistor 46. The output signal from the saturation feedback circuit 12 will now trigger the bistable circuit 14 back to its original mode in which transistor 91 again becomes conductive. The unlocking circuit 13 will again operate substantially as described above but with transistor 151 conductive to bypass transistor 36. This polarity reversal thus occurs every time the magnetic core is saturated and serves to start the traversions of the hysteresis loop towards the opposite saturation point. Since this reversal is automatic and occurs each time the core saturates, the system operates as a very low frequency oscillator with traverse of the complete hysteresis loop for each half cycle.

In summary, the low frequency magnetic oscillator of this invention uses the principle of applying a very slightly unbalanced alternating current to a saturable magnetic core in order to produce an exceptionally long saturation time. This magnetic core together with the associated circuitry described, permits long oscillations on the order of five minutes per cycle to be obtained.

Many changes and modifications of this invention will undoubtedly occur to those who are skilled in the art, and I therefore wish it to be understood that I intend to be limited by the scope of the appended claims and not by the specific embodiment of my invention which is disclosed herein for the purpose of illustration only.

I claim:

1. Low frequency oscillator apparatus comprising: saturable magnetic core means; a source of alternating current potential; a source of direct current potential; first asymmetric current flow circuit means conductive in one direction and having a first control member; second asymmetric current flow circuit means conductive in a direction opposite to said first circuit means and having a second control member; control means interconnecting said first and second circuit means effective upon sensing an increase in current in one of said circuit means to render the other nonconductive; connective means comprising said first and second asymmetric circuit means connecting said alternating current potential in energizing relation to said saturable core means; polarity reversing switching means having control and switching electrodes, said switching electrodes interconnecting said direct current potential to said saturable magnetic core means to reverse the polarity of said direct current potential upon a signal being applied to said control electrodes; and means connecting said control electrodes to said connective means for causing the reversal of the polarity of said direct current source upon each occurrence of said control means rendering one of said circuit means nonconductive.

2. Low frequency oscillator apparatus comprising: saturable magnetic core means; a source of alternating current potential; a source of direct current potential; first asymmetric current flow circuit means conductive in one direction and having a first control member; second asymmetric current flow circuit means conductive in a direction opposite to said first circuit means and having a second control member; control means interconnecting said first and second circuit means and effective upon sensing an increase in current in either one of said circuit means to render the other nonconductive; connective means comprising said first and second asymmetric circuit means connecting said alternating current potential in energizing relation to said saturable core means whereby positive half cycles of said alternating current flow through said first circuit means and the negative half cycles flow through said second circuit means; polarity reversing switching means having control and switching electrodes; said switching electrodes interconnecting said direct current potential to said saturable magnetic core means in energizing relation thereto, said switching means being operative to reverse the polarity of said direct current potential upon a signal being applied to said control electrodes; and means connecting said control electrodes to said connective means to sense the effect of said increase in current and provide a signal in response thereto to operate said switching means causing the reversal of the polarity of said direct current source.

3. Low frequency oscillator apparatus comprising: saturable magnetic core means; a source of alternating current potential; a source of direct current potential; first normally conductive asymmetric current flow circuit means conductive in one direction and having a first control member; second normally conductive asymmetric current flow circuit means conductive in a direction opposite to said first circuit means and having a second control member; connective means comprising said first and second asymmetric circuit means connecting said alternating current potential in energizing relation to said saturable core means; polarity reversing switching means having control and switching electrodes, said switching electrodes interconnecting said direct current potential to said saturable magnetic core means, said direct current in effect unbalancing said alternating current to cause the core flux to move slowly to saturation in a series of minor hysteresis loops; control means interconnecting said first and second circuit means and effective upon the current exceeding a predetermined magnitude in one of said circuit means as a result of reaching saturation to render the other asymmetric circuit means nonconductive; and means connecting said control electrodes to said connective means for causing the reversal of the polarity of said direct current source upon occurrence of said control means rendering one of said circuit means nonconductive.

4. Low frequency oscillator apparatus comprising: saturable magnetic core means; a source of alternating current potential; a source of direct current potential; first and second normally conductive unidirectional current paths, said second current path being conductive in the opposite direction than said first current path; first circuit means comprising said first and second current paths connecting said alternating current source in energizing relation to said saturable core means; second circuit means connecting said direct current potential in energizing relationship to said saturable magnetic core means; polarity reversing switching means in said second circuit means having control and switching electrodes, said switching electrodes being connected to reverse the polarity of said source of direct current potential to said saturable magnetic core means upon a signal being applied to said control electrodes; control means interconnecting said first and second current paths and effective upon an increase in current in one of said paths to render the other of said paths nonconductive; and means connecting said control electrodes to said first circuit means to sense said increase in current and operate the switching means to cause the reversal of the polarity of said direct current source in response thereto.

5. Low frequency oscillator apparatus comprising: saturable magnetic core means; a source of alternating current potential; a source of direct current potential; first and second normally conductive unidirectional current paths, said second current path being connected to conduct in the opposite direction than said first current path; first circuit means comprising said first and second current paths connecting said alternating current source in energizing relation to said saturable core means; second circuit means connecting said direct current potential in energizing relation to said saturable magnetic core means; polarity reversing switching means in said second circuit means having control and switching electrodes, said switching electrodes being operable to reverse the polarity of said source of direct current potential to said saturable magnetic core means; control means interconnecting said first and second current paths and effective upon an increase in current in one of said paths which signifies saturation of said core means to render the other of said paths conductive; means connecting said control electrodes to said first circuit means to sense said increase in current and operate the switching means to cause the reversal of the polarity of said direct current source in response thereto; and current control means responsive to the operation of said switching means to provide a momentary current bypass to shunt said nonconductive current path.

6. Low frequency oscillator apparatus comprising: saturable magnetic core means; a source of alternating current potential of sufficient amplitude to accomplish a change in the flux of said magnetic core means but of insufficient magnitude to saturate said core means; a source of direct current potential of small magnitude compared to said alternating current potential; first and second normally conductive unidirectional current paths, said second current path being connected to conduct in the opposite direction than said first current path; first circuit means comprising said first and second current paths connecting said alternating current source in energizing relation to said saturable core means; second circuit means connecting said direct current potential in energizing relation to said saturable magnetic core means thereby causing a slight unbalance in the alternating current such that the core flux moves slowly towards saturation in a series of minor hysteresis loops; polarity reversing switching means in said second circuit means having control and switching electrodes, said switching electrodes being connected to reverse the polarity of said source of direct current potential to said saturable magnetic core means upon a signal being applied to said control electrodes; control means interconnecting said first and second current paths and effective upon saturation of said core means signified by an increase in current in one of said paths to render and maintain the other of said paths nonconductive; and means connecting said control electrodes to said first circuit means to sense said increase in current and operate the switching means to cause the reversal of the polarity of said direct current source in response thereto.

No references cited.